United States Patent [19]
Costen et al.

[11] Patent Number: 5,832,615
[45] Date of Patent: Nov. 10, 1998

[54] HAND-HELD CUTTING TOOL WITH FATIGUE-RESISTANT BLADE

[75] Inventors: Michael K. Costen, Milford, Conn.; Clark Scott, Littleton, Colo.

[73] Assignee: Pumpkin, Ltd., Denver, Colo.

[21] Appl. No.: 763,529

[22] Filed: Dec. 12, 1996

[51] Int. Cl.⁶ ............................................. B25G 3/00
[52] U.S. Cl. ............................................ 30/517; 30/342
[58] Field of Search ........................ 30/517, 342, 343, 30/314, 317, 340, 344, 166.3, 115; 16/110 R

[56] References Cited

U.S. PATENT DOCUMENTS

| | | | |
|---|---|---|---|
| 180,711 | 8/1876 | Gottschalk | 30/343 X |
| 2,382,304 | 8/1945 | Foltz et al. | 30/343 |
| 2,827,086 | 3/1958 | Minor | 30/517 |
| 2,966,931 | 1/1961 | Dreier | 30/342 X |
| 3,480,055 | 11/1969 | La Pointe | 30/517 |
| 3,756,298 | 9/1973 | West | 30/517 X |
| 4,827,619 | 5/1989 | Alm | 30/517 X |
| 4,841,638 | 6/1989 | Bardeen et al. | |

FOREIGN PATENT DOCUMENTS 909709  10/1962  United Kingdom ............. 30/517

*Primary Examiner*—Eugenia A. Jones
*Attorney, Agent, or Firm*—Timothy J. Martin; Michael R. Henson

[57] ABSTRACT

A hand-held tool is used to cut soft materials, such as pumpkins, for example in the carving of decorative designs. The tool has an elongated handle that has a forward cavity. A stiff blade extends forwardly of the handle in a longitudinal direction and has a shank portion in the cavity to reduce the danger of fatigue breakage.

15 Claims, 2 Drawing Sheets

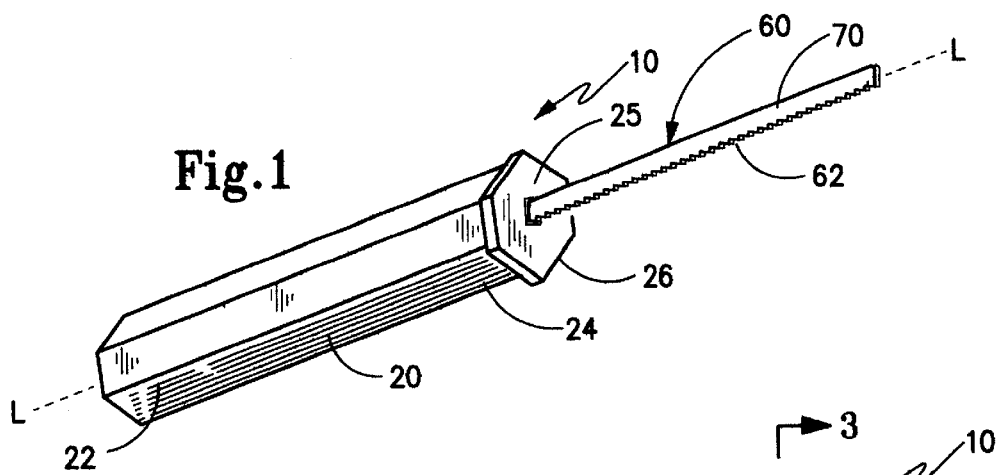
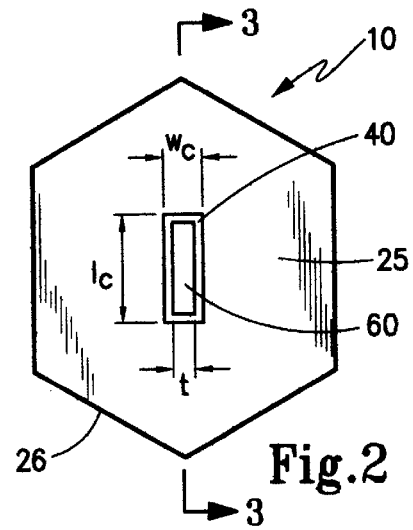
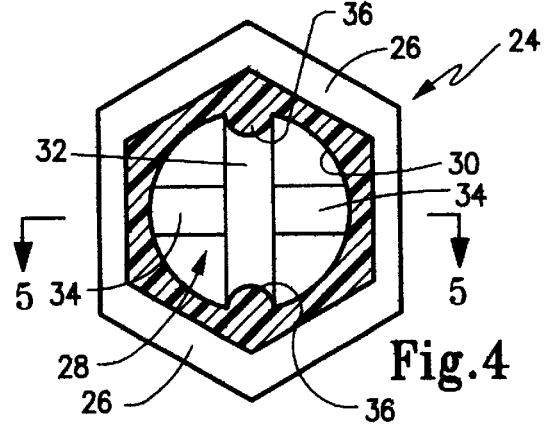
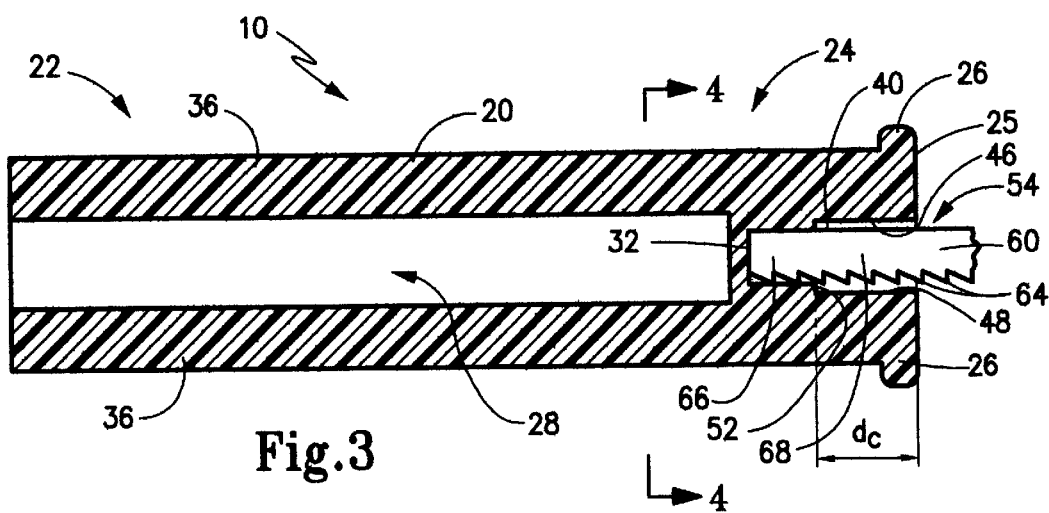

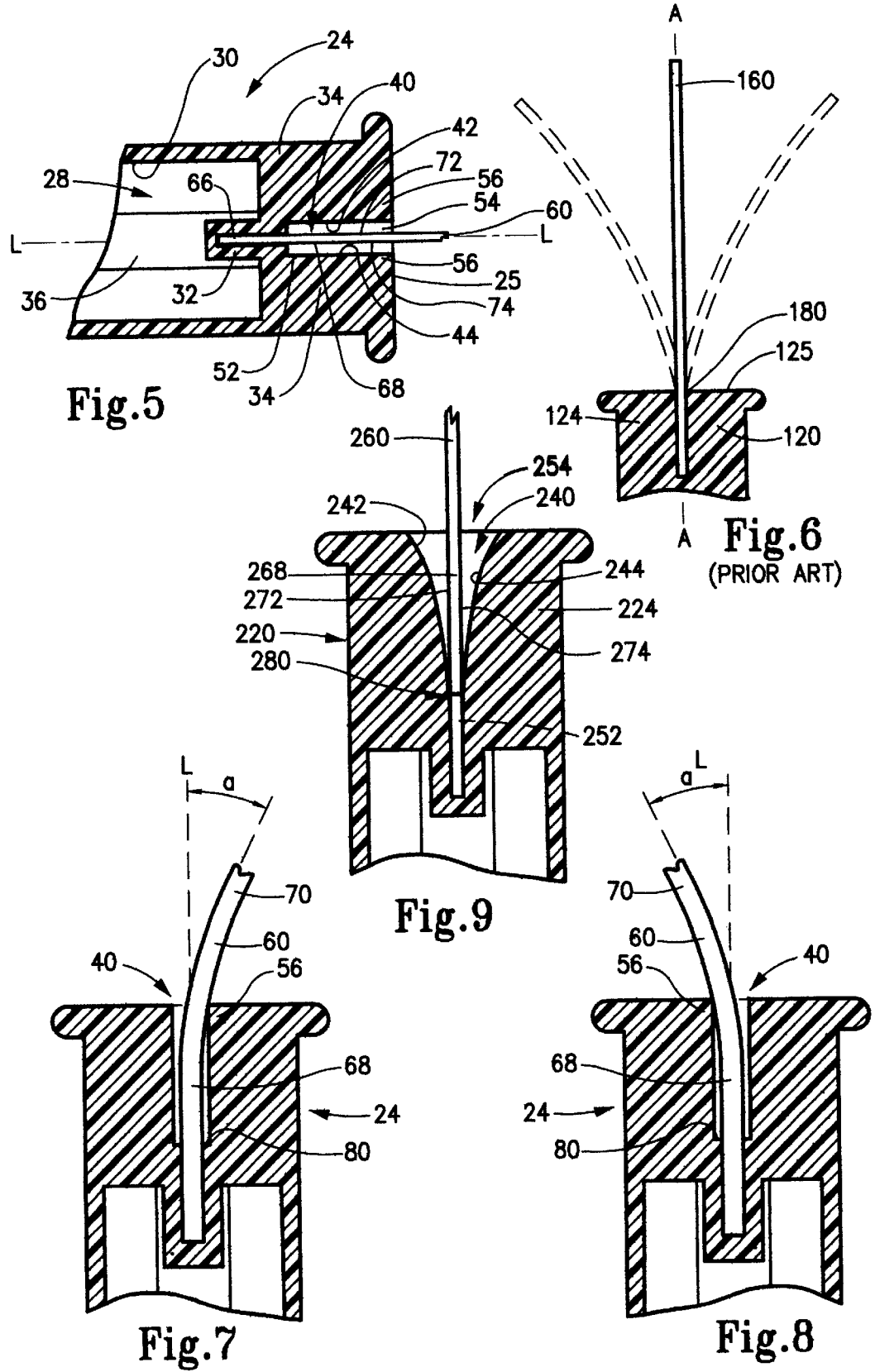

HAND-HELD CUTTING TOOL WITH FATIGUE-RESISTANT BLADE

FIELD OF THE INVENTION

The present invention is broadly directed to cutting tools, but is more particularly directed to a hand-held tool which may be used for cutting relatively soft materials. Specifically, the present invention is directed to small, hand-held saws which may be used for carving features in soft materials.

BACKGROUND OF THE INVENTION

A cutting tool is one of the most basic of all working implements employed by humans. While some cutting tools are mechanically driven, a vast majority of cutting tools are hand-held so that they may be manipulated to perform a specific function. For example, knives, awls, saws, scissors, chisels and the like are all examples of cutting tools found in everyday use. Not only is there a plethora of distinct types of cutting tools, but many varieties exist within each type, so that a specific or specialized function may be performed.

One specialized area of cutting tools which has been developed by the assignee of this invention are those tools particularly adapted for cutting or carving features into relatively soft materials such as pumpkins, squashes, melons, etc. Here, a decorative design is placed in the pumpkin, for example, and the design features are then carved in the shell of the pumpkin primarily by a small, hand-held saw and by drilling tools. In order to carve intricate features, it is necessary that the saw blade be relatively thin so as to permit fine control when cutting the selected feature.

Typically, such hand-held sawing tools are formed by an elongated handle which may be grasped by a user, and an elongated blade projects axially of the handle with one or both edges of the blade being serrated with saw teeth. Heretofore, the forward end of the handle from which the blade projects has been formed as a flat, transverse face which rigidly holds the blade at the intersection of the forward face and the blade. The shank portion of the blade is mounted rigidly in the handle such as by injection molding of the shank in the handle body. Here, the handle body may be either solid or hollowed out.

An improvement to hand-held cutting tools, such as saws and drills, is described in U.S. Pat. No. 4,841,638, issued Jun. 27, 1989 to Bardeen et al and assigned to the assignee of the present invention. In this patent, a blade shank was secured internally of a two-piece handle portion by means of a longitudinal channel structure and collar on one-half of the handle cooperating with mounting pins received in the collars and carried by the other half of the handle. Limit stops were provided to prevent unwanted movement of the blade along the junction of the two handle portions.

A problem has been noted with respect to all of the above described hand-held sawing tools that use a relatively thin blade. If the sawing action is performed improperly, the blade often deflects from side-to-side due to the resistance of the forward stroke. Such deflections over time cause a sharp bending at the junction between the blade and handle thus repetitively fatiguing the blade along this junction line. The fatigue of the metal can cause the saw blade to break.

Accordingly, despite the developments of such cutting tools in the past, there remains a need for improved and safer hand-held tools. There is a need for a hand-held tool which mechanically compensates, to some degree, for improper use yet which at the same time can be mass produced at a relatively low cost. There is a further need for a hand-held cutting tool which exhibits reduced fatigue of the blade during use. The present invention is directed to meeting these needs.

SUMMARY OF THE INVENTION

It is an object of the present invention to provide a new and useful hand-held cutting tool.

It is another object of the present invention to provide a hand-held cutting tool that has a blade that is mechanically protected, to some degree, against fatigue.

Another object of the present invention is to provide a hand-held cutting tool that is safer to use.

Still a further object of the present invention is to provide a hand-held cutting tool having a relatively thin serrated saw blade especially adapted for cutting relatively soft materials.

Still a further object of the present invention is to provide a hand-held cutting tool that is easy to manufacture and relatively inexpensive in cost.

According to the present invention, then, a hand-held tool is adapted to cut soft materials. Broadly, this tool includes an elongated handle having a longitudinal axis that is sized and adapted to be grasped by a user's hand. The handle includes a rearward end portion and a forward end portion and has a longitudinally extending cavity formed in the forward end portion. This cavity has a bottom wall, a surrounding cavity sidewall and an opening that defines a shoulder. A stiff yet flexible blade element is mounted in the handle and extends longitudinally thereof so as to include a cutting portion projecting forwardly of the forward end portion of the handle. This cutting portion engages a material to be cut. The blade element includes a shank portion disposed in the cavity with opposite sides of the shank portion spaced from the surrounding sidewall thereof. Thus, the blade can deflect within a range of 2° to 8° degrees on either side of the at rest position at which point it contacts the shoulder.

The shank portion of the blade element may be rectangular in cross-section with the cavity correspondingly being rectangular in cross-section. The cavity may have opposed arcuate walls respectively facing the sides of the shank portion with these opposed arcuate walls being outwardly divergent from one another and being in abutting relation to the sides of the shank portion at a location proximate to the bottom wall of the cavity. Preferably, the cavity is oriented axially of the handle with the blade element extending co-axially of the longitudinal axis thereof.

The handle is formed as an integral piece of molded plastic material, and the blade element has a mounting portion that is molded directly into the body of the handle. In one embodiment of the invention, the hand-held tool is a sawing tool so that the cutting portion has a serrated edge. Where the blade is a saw, serrated teeth on the mounting portion may be forwardly projecting to help affix the blade to the handle. In any event, the handle includes a laterally outwardly projecting lip disposed on the forward end portion of the handle with this lip operative to engage a user's fingers during use. Moreover, the handle has a hollow interior formed by a surrounding handle sidewall. A housing is formed in the interior of the handle with this housing defining the cavity. A plurality of webs interconnect the housing with the handle sidewall thereby to support the housing against movement.

These and other objects of the present invention will become more readily appreciated and understood from a consideration of the following detailed description of the exemplary embodiments when taken together with the accompanying drawings, in which:

BRIEF DESCRIPTION OF THE DRAWINGS

FIG. 1 is a perspective view of the handle-held tool according to a first exemplary embodiment of the present invention;

FIG. 2 is a front (forward) end view in elevation of the hand-held tool of FIG. 1;

FIG. 3 is a side view in cross-section, taken about lines 3—3 of FIG. 2;

FIG. 4 is a cross-sectional view, taken about lines 4—4 of FIG. 3;

FIG. 5 is a cross-sectional view, taken about lines 5—5 of FIG. 4;

FIG. 6 is a side view in cross-section showing the forward end of a prior art hand-held tool;

FIG. 7 is a side view in cross-section of the forward end of a hand-held tool shown in FIGS. 1–5 with the blade deflected in a first direction;

FIG. 8 is a side view in cross-section of the forward end of the hand-held tool shown in FIGS. 1–5 with the blade thereof deflected in a second direction; and FIG. 9 is a side view in cross-section of the forward end portion of a second exemplary embodiment of the present invention.

DETAILED DESCRIPTION OF THE EXEMPLARY EMBODIMENTS

The present invention is directed to a hand-held tool, and in particular, a hand-held tool that is adapted to cut soft materials. Broadly, the invention includes an elongated handle which mounts and supports a stiff yet flexible blade element. An important feature of this invention is the inclusion of a cavity which receives a shank portion of the blade element so as to reduce fatigue and, therefore, the risk of breakage of the blade. While the invention is described as a hand-held sawing tool, it should be understood that other blade elements for cutting tools are within the scope of this invention.

With reference, then, to FIGS. 1–5, a first exemplary embodiment of the hand-held tool according to the present invention is shown as a hand-held sawing tool 10. In these Figures, it may be seen that sawing tool 10 has an elongated handle 20 which has a longitudinal axis "L" with elongated handle 20 being sized and adapted to be grasped by a user's hand. Handle 20 has a rearward end portion 22 and a forward end portion 24 that terminates in a laterally outwardly projecting lip 26 that is operative to engage a user's fingers during use. Handle 20 has a hollow interior 28 formed by surrounding handle sidewall 30. A pair of longitudinally extending opposed ribs 36 reinforce the strength of sidewall 30.

Preferably, handle 20 is formed as an integral piece of molded material, such as high impact polystyrene. A cavity 40 is formed in forward end portion 24, specifically in a front face 25 of forward end portion 24. As is shown in FIGS. 3–5, cavity 40 is formed in a housing 32 that is defined by a diametric web extending across interior 28 between opposed portions of sidewall 30. Diametrically opposed webs 34 support housing 32 which is disposed in the interior of handle 20.

In the first exemplary embodiment, cavity 40 is rectangular in shape that includes a surrounding cavity sidewall defined by a first pair of opposed walls 42, 44 and a second pair of opposed walls 46, 48. Cavity 40 also has a bottom wall 52 formed oppositely an opening 54 that defines shoulders 56 in front face 25. Thus, shoulders 56 are in opposed relation to one another. Cavity 40 extends longitudinally of handle 20 and is preferably oriented axially therewith along longitudinal axis "L". As is shown in FIG. 2, cavity 40 has a cavity width "$w_c$" and a cavity length "$1_c$". With reference to FIG. 3, it may also be seen that cavity 40 has a depth "$d_c$". In the embodiment shown in FIGS. 1–5, "$w_c$" is 0.058" (0.147 centimeter), "$1_c$" is 0.187" (0.475 centimeter) and "$d_c$" is 0.250" (0.635 centimeter).

A stiff yet flexible blade element which in FIGS. 1–5 is a saw blade 60 is mounted in handle 20 and extends longitudinally thereof. Preferably, blade element extends co-axially with the longitudinal axis "L" so that it is co-axial with handle 20 as well. Preferably, saw blade 60 has a serrated edge 62 formed by a plurality of forwardly projecting teeth 64. By having the blade teeth project in the forward direction, cutting occurs as the blade 60 moves forwardly in the longitudinal direction. With this orientation, cuttings will be discharged forwardly instead of rearwardly. Where a pumpkin is carved, for example, this will result in the cuttings being discharged internally of the shell, thus avoiding a build-up of cuttings on the outer surface of the shell during carving.

As is shown in FIGS. 1, 3 and 5, saw blade 60 has a mounting portion 66 disposed in and secured by handle 20, a shank portion 68 disposed in cavity 40 and a cutting portion 70 that extends forwardly of forward end portion 24 whereby a material to be cut may be engaged by cutting portion 70. As may also be seen in these figures, shank portion 68 has opposite sides 72, 74 respectively facing cavity walls 42 and 44 in spaced therefrom a selected distance. To this end, and with reference to FIG. 2, it may be seen that saw blade 60 has a thickness "T" measured between opposite sides 72 and 74 with thickness "T" preferably being about 0.022" to 0.025" (0.056–0.064 cm) To this end, also, it is preferred that shank portion 68 be rectangular in cross-section. As is shown in FIG. 3, mounting portion 66 of saw blade 60 is molded into the plastic material of handle 20 and, by virtue of the forwardly projecting teeth 64, is held securely in position and in an affixed relation to handle 20 in the axial orientation.

As noted in the background section of this invention, various prior art devices are prone to fatigue breakage. As is illustrated in FIG. 6, an example of such a prior art device is shown wherein a handle portion 120 secures a blade element 160 in a normal "at rest" state that is co-axial along axis "A". However, deflections of blade 160, as is shown in phantom, cause stress about a junction location 180 between front face 125 of forward end portion 124 of handle 120. Thus, blade 160 tends to fatigue due to the bending moment of blade 160 with handle 120 at junction 180.

On the other hand, the present invention helps reduce fatigue and thus breakage of saw blade 60 by providing cavity 40, as is shown in FIGS. 7 and 8. Here, it should be appreciated that saw blade 60 has a normal "at rest" state wherein it is oriented along longitudinal axis "L". However, it may be deflect either to the right (FIG. 7) or to the left (FIG. 8) an angle "a" prior to engaging a shoulder 56. This allows shank portion 68 and cutting portion 70 to arcuately flex and protects against fatigue at the junction location 80. Preferably, "a" has a range of 2° to 8°, inclusively and is about 5° in the embodiment shown in FIGS. 1–5.

An alternative exemplary embodiment of the present invention is shown in FIG. 9. Here, cavity 240 is formed in forward end portion 224 of handle 220 with cavity 240 having a pair of opposed arcuate walls 242, 244 respectively facing sides 272, 274 of shank portion 268. As may be seen in FIG. 9, arcuate walls 242, 244 are outwardly divergent from one another to terminate in an opening 254. Moreover, arcuate walls 242, 244 are in abutting relationship to sides 272, 274 of shank portion 268 at a location 280 that is proximate to bottom wall 252 of cavity 240 (shown in phantom). It should be appreciate that arcuate walls 242, 244 may have an advantage in facilitating the bending of assembly 260 when it is deflected from the normal state. However, injection molding of this configuration is more difficult so that the rectangular cavity 40 shown in FIGS. 1–5 has the advantage of ease in manufacturer.

Accordingly, the present invention has been described with some degree of particularity directed to the exemplary embodiment of the present invention. It should be appreciated, though, that the present invention is defined by the following claims construed in light of the prior art so that modifications or changes may be made to the exemplary embodiment of the present invention without departing from the inventive concepts contained herein.

We claim:

1. A hand-held tool adapted to cut soft materials, comprising:
   (a) an elongated handle having a longitudinal axis, said handle including a rearward end portion and a forward end portion and having a longitudinally extending cavity formed in said forward end portion wherein the cavity has a bottom wall, a surrounding cavity sidewall and an opening that defines a pair of opposed shoulders; and
   (b) a stiff yet flexible blade element mounted in said handle and extending longitudinally thereof such that a cutting portion projects forwardly of said forward end portion whereby a material to be cut may be engaged thereby, said blade element including a shank portion disposed in the cavity with opposite sides of said shank portion spaced from the surrounding sidewall along an entire width thereof so that said shank portion can undergo flexion within said cavity, said blade element including a mounting portion disposed in said handle, said handle being formed as an integral piece of molded plastic material with said mounting portion of said blade element being molded therein.

2. A hand-held tool according to claim 1 wherein said blade element includes a serrated edge such that said blade element defines a sawing instrument.

3. A hand-held tool according to claim 1 wherein said shank portion of said blade element is rectangular in cross-section and wherein the cavity is rectangular in cross-section.

4. A hand-held tool according to claim 1 wherein said forward end portion of said handle includes a laterally outwardly projecting lip operative to engage a user's fingers during use.

5. A hand-held tool according to claim 1 wherein the cavity is oriented axially of said handle and wherein said blade element extends coaxially of the longitudinal axis.

6. A hand-held tool according to claim 1 wherein said handle has a hollow interior formed by a surrounding handle sidewall and including a housing defining said cavity, said housing being disposed in the interior of said handle.

7. A hand-held tool according to claim 6 including a plurality of webs interconnecting said housing and said handle sidewall thereby to support said housing in the interior of said handle.

8. A hand-held sawing tool adapted to be grasped by a user's hand for manipulation in cutting soft materials, comprising:
   (a) an elongated handle having a longitudinal axis, said handle including a rearward end portion and a forward end portion and having a longitudinally extending cavity formed in said forward end portion wherein the cavity has a bottom wall, a surrounding cavity sidewall and an opening that defines a pair of opposed shoulders, said handle having a hollow interior formed by a surrounding handle sidewall and including a housing defining said cavity, said housing being disposed in the interior of said handle, and including a plurality of webs interconnecting said housing and said handle sidewall thereby to support said housing in the interior of said handle; and
   (b) a stiff yet flexible blade element mounted in said handle and extending longitudinally thereof, said blade element including a serrated cutting portion projecting forwardly of said forward end portion whereby a material to be cut may be engaged thereby, said blade element including a shank portion having a rectangular cross-section and disposed in the cavity with opposite sides of said shank portion spaced from the surrounding sidewall thereof when said blade element is in a normal state whereby said shank portion is movable within the cavity between a first side of the surrounding sidewall and a second side of the surrounding sidewall opposite the first side thereof.

9. A hand-held sawing tool according to claim 8 wherein the cavity is rectangular in cross-section.

10. A hand-held tool according to claim 9 wherein the cavity has opposed arcuate walls respectively facing the sides of said shank portion, said opposed arcuate walls being outwardly divergent yet in abutting relation to the sides of said shank portion at a location proximate to the bottom wall of the cavity.

11. A hand-held tool according to claim 8 wherein said blade element has a mounting portion located at a proximal end thereof, said handle being formed as an integral piece of molded plastic material with said mounting portion of said blade element being molded therein.

12. A hand-held sawing tool according to claim 11 wherein said blade element is provided with forwardly facing teeth, respective ones of said teeth disposed on said mounting portion operative to secure said blade element in an affixed relation to said handle.

13. A hand-held sawing tool according to claim 8 wherein the cavity is configured such that said blade element contacts said shoulder when deflected from the normal state by an amount within a range of 2° to 8°, inclusively.

14. A hand-held tool adapted to cut soft materials, comprising:
   (a) an elongated handle having a longitudinal axis, said handle including a rearward end portion and a forward end portion and having a longitudinally extending cavity formed in said forward end portion wherein the cavity has a bottom wall, a surrounding cavity sidewall and an opening that defines a pair of opposed shoulders, said cavity having opposed arcuate walls respectively facing the sides of said shank portion, said opposed arcuate walls being outwardly divergent; and
   (b) a stiff yet flexible blade element mounted in said handle and extending longitudinally thereof such that a cutting portion projects forwardly of said forward end portion whereby a material to be cut may be engaged thereby, said blade element including a shank portion disposed in the cavity with opposite sides of said shank portion spaced from the surrounding sidewall along an entire width thereof so that said shank portion can undergo flexion within said cavity.

15. A hand-held tool according to claim 14 wherein said opposed arcuate walls are in abutting relation to the sides of said shank portion at a location proximate to the bottom wall of the cavity.

* * * * *